(12) United States Patent
Trede et al.

(10) Patent No.: US 8,997,350 B2
(45) Date of Patent: Apr. 7, 2015

(54) DEVICE AND METHOD FOR MOUNTING AND DISMANTLING A COMPONENT OF A WIND TURBINE

(75) Inventors: Alf Trede, Immenstedt (DE); Mathias Mier, Husum (DE); Jochen Fuglsang-Petersen, Heide (DE)

(73) Assignee: Senvion SE, Hamburg (DE)

( * ) Notice: Subject to any disclaimer, the term of this patent is extended or adjusted under 35 U.S.C. 154(b) by 1631 days.

(21) Appl. No.: 11/791,235

(22) PCT Filed: Nov. 18, 2005

(86) PCT No.: PCT/DE2005/002081
§ 371 (c)(1),
(2), (4) Date: May 21, 2007

(87) PCT Pub. No.: WO2006/053554
PCT Pub. Date: May 26, 2006

(65) Prior Publication Data
US 2007/0290426 A1    Dec. 20, 2007

(30) Foreign Application Priority Data
Nov. 22, 2004  (DE) .......................... 10 2004 056 340

(51) Int. Cl.
| | | |
|---|---|---|
| B21K 25/00 | (2006.01) | |
| B66C 23/18 | (2006.01) | |
| F03D 1/00 | (2006.01) | |
| F03D 11/00 | (2006.01) | |

(52) U.S. Cl.
CPC ............... *F03D 1/001* (2013.01); *F03D 1/003* (2013.01); *F03D 11/0008* (2013.01); *F05B 2240/916* (2013.01); *Y02E 10/721* (2013.01); *Y02E 10/722* (2013.01); *Y02E 10/728* (2013.01)

(58) Field of Classification Search
USPC .............................. 29/889.2, 23.51; 212/179
See application file for complete search history.

(56) References Cited

U.S. PATENT DOCUMENTS 7,207,777 B2 *   4/2007  Bervang ..................... 416/119
7,785,073 B2 *   8/2010  Wobben .................. 416/146 R
(Continued)

FOREIGN PATENT DOCUMENTS

| DE | 197 26 408 | 3/1999 |
|---|---|---|
| DE | 10318675 A1 * | 11/2004 |

(Continued)

OTHER PUBLICATIONS

Machine Translation of DE 103 18 675 German to English Dec. 14, 2010.*

(Continued)

*Primary Examiner* — Jacob Cigna
(74) *Attorney, Agent, or Firm* — Nash and Titus, LLC

(57) ABSTRACT

The invention relates to a device for mounting and/or dismantling a component (10), in particular a rotor blade of a wind turbine (20) comprising a tower head (21). Said device comprises at least one guide element (30) that stretches between the tower head (21) and the ground (40) and has at least one supporting device (60) that is essentially fixed in the air, supporting at least a partial load of the weight of the component (10) during the transport of the latter (10) between the ground (40) and the wind turbine (20). At least one guy (70) leads from the supporting device (60) to the component (10), whereby the length of said guy between the supporting device (60) and the component (10) can be modified.

33 Claims, 4 Drawing Sheets

(56) References Cited

U.S. PATENT DOCUMENTS

2004/0154869 A1* 8/2004 May .............................. 187/239
2006/0151767 A1* 7/2006 Wobben ......................... 254/334

FOREIGN PATENT DOCUMENTS

| DE | 20 2004 016 460 | | 12/2004 |
|----|-----------------|---|---------|
| EP | 1126163 | A | 8/2001 |
| EP | 1 239 150 | | 9/2002 |
| JP | 57148073 | | 9/1982 |
| JP | 2004 293455 | | 10/2004 |
| JP | 2005002875 | | 1/2005 |
| WO | WO 97/21621 | | 6/1997 |
| WO | WO 03100249 | A1 * | 12/2003 |
| WO | WO 03102409 | A1 * | 12/2003 |
| WO | WO 2004/067954 | A1 | 8/2004 |
| WO | WO 2004067954 | A1 * | 8/2004 |

OTHER PUBLICATIONS

International Preliminary Report on Patentability in corresponding PCT application PCT/EP2005/002081 (English translation), mailed May 31, 2007 (14 pages).

International Search Report in corresponding priority international application PCT/DE2005/002081 (date mailed Oct. 6, 2006) (2 pages).

* cited by examiner

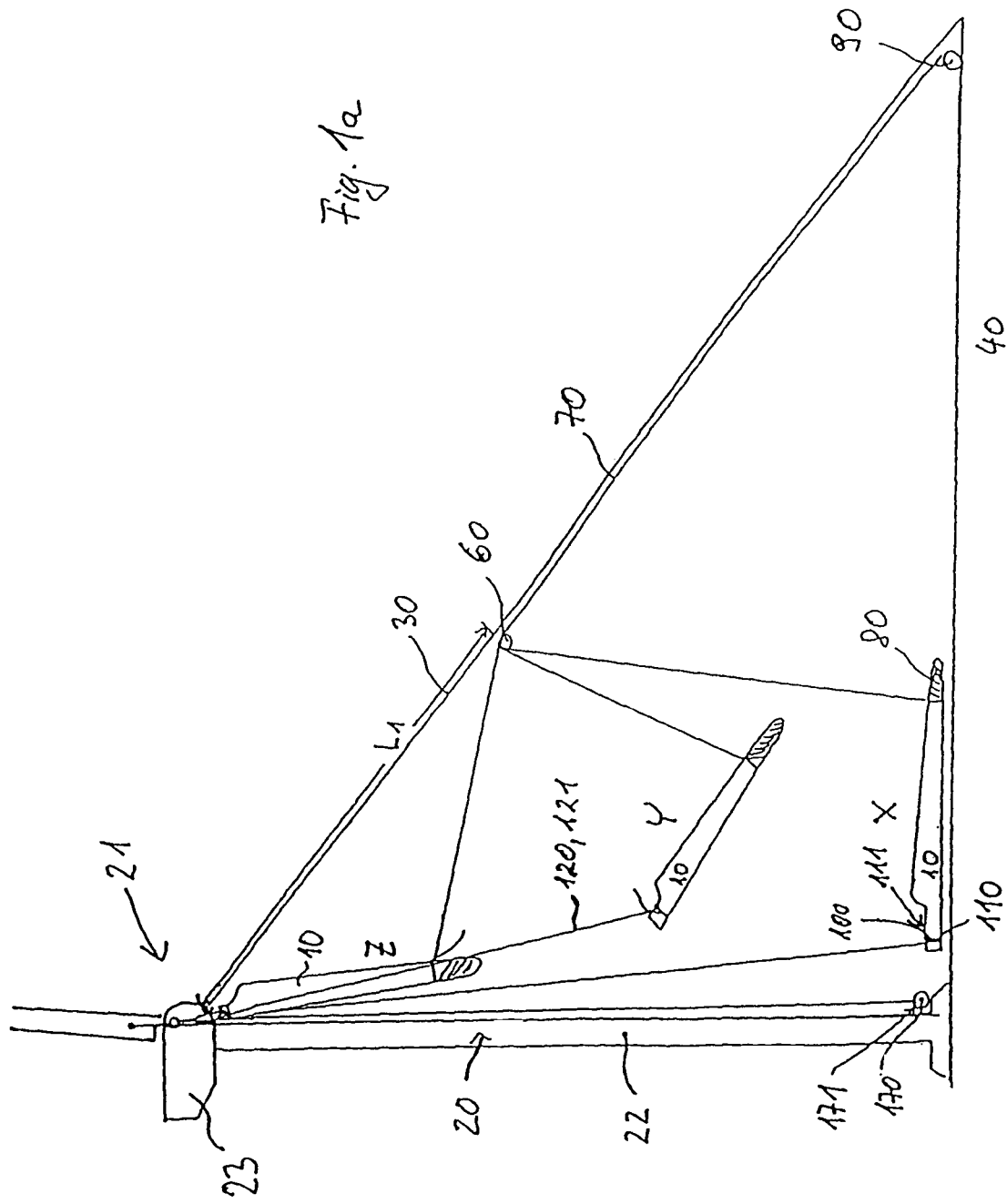

DEVICE AND METHOD FOR MOUNTING AND DISMANTLING A COMPONENT OF A WIND TURBINE

BACKGROUND OF THE INVENTION

The invention relates to an apparatus for mounting and/or dismantling a component, in particular a rotor blade, of a wind turbine and to a wind turbine and a collar (or sleeve or packing) in particular for this apparatus, as well as to a process for mounting and/or dismantling a component, in particular a rotor blade or rotor blade bearing of a wind turbine.

In wind turbines damage to the rotor blades can occur, e.g., by lightning strike, corrosion or hail. The damaged rotor blades are then replaced in order to keep the downtimes of the wind turbine as low as possible.

The replacement of the rotor blades takes place in a known manner with a crane. At first, the damaged rotor blade is rotated horizontally facing to one side or vertically under the rotor hub. There, the damaged rotor blade is fastened to the traction cable of the crane. All rotor blades have a flange at their root, which flange is firmly connected to flanges arranged on the rotor hub. The flange connection of the damaged rotor blade is separated and the damaged rotor blade can then be let down and removed. Subsequently, an intact rotor blade is fastened to the traction cable of the crane and drawn up to the rotor hub. However, the known processes have the disadvantages of the high expense for renting, procuring and removing and operating the crane.

WO 2004/067954 A1 teaches a mounting process in which no large crane is needed. To this end two guide cables are tensioned vertically to the tower along which the rotor blade can be transported by continuous winding. However the process has the disadvantage that the rotor blade is delivered horizontally to the ground and therefore the rotor blade must first be brought into a vertical position. This can result in damage to the rotor blade tip when it is drawn over the ground. Usually, the blade tip is raised with a small auxiliary crane or the blade tip is placed on a carriage and rolled over the ground on it. The latter variant of the process presupposes a fairly level ground. Furthermore, there is the danger that the rotor blade transported close to the tower strikes against the tower in a strong wind.

WO 97/21621 teaches a mounting apparatus that comprises a pivotable tower headpiece on whose arms the generator is drawn up at first and is positioned after reaching a sufficient height by pivoting the arm above the tower head.

SUMMARY OF THE INVENTION

The invention addresses the problem of making a process and an apparatus available with the aid of which a simple and protective mounting and/or dismantling of components, especially rotor blades, of a wind turbine is possible without a crane.

As regards the apparatus the problem is solved by a mounting and/or dismantling apparatus with the features described below, by a wind energy turbine with the features described below and a collar with the features described below.

BRIEF DESCRIPTION OF THE FIGURES

FIG. 1a schematically shows a process in accordance with the invention,

DETAILED DESCRIPTION

Figure 1B:
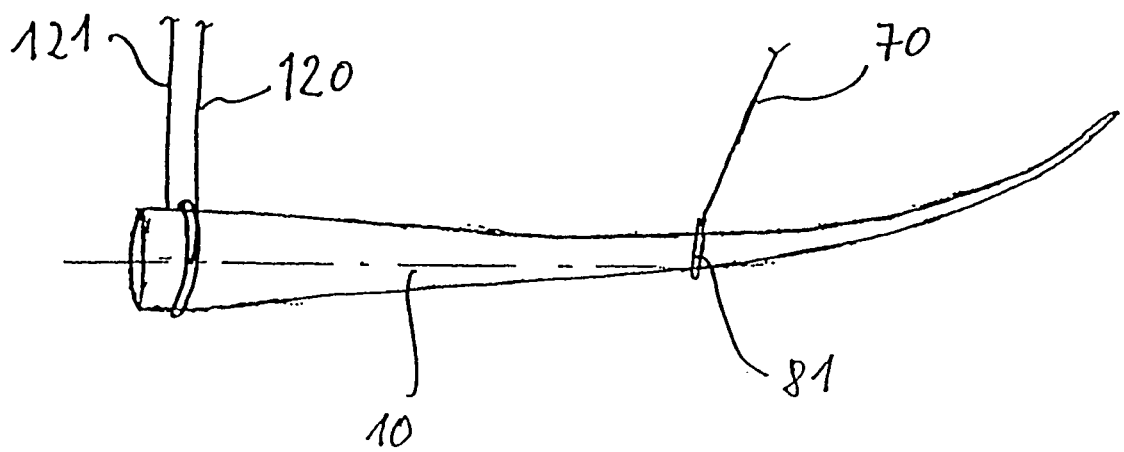
FIG. 1b shows fastening points for a pre-bent rotor blade.

The invention makes use of the concept of making a holding apparatus available that is preferably stationary on the guide cable for mounting and/or dismantling and from which a holding cable for the component runs with the aid of which the component is transported. It is advantageous if the end of the holding cable is fastened to the component or the holding cable is reeved into a deflection roller arranged on the component. In the second embodiment the holding cable is advantageously guided back to the guide means, preferably to the holding apparatus, and its end fastened to the tower head. The holding apparatus assumes quasi a part of the traditional crane function.

The guide means is advantageously tensioned obliquely between the tower head and the ground. In a preferred embodiment of the invention the guide means is designed as a rigidly tensioned guide cable so that the position of the holding apparatus remains stationary or fixed even under the tractive load of the component on the guide cable. The position of the holding apparatus is advantageously substantially stationary and positionally rigid relative to the wind turbine even in space during the mounting and dismantling procedure. However, certain fluctuations and movements of the stationary holding apparatus can not be excluded and they are also not damaging.

In another preferred embodiment of the invention the holding apparatus can be moved along the guide means during the mounting/dismantling procedure. In this manner the component raised from the ground on the holding cable can be moved along the guide means toward the tower. Other loading cables can be dispensed with in this embodiment. The holding apparatus can preferably be stopped firmly in its position at various positions of the guide means. The various stop positions can merge continuously into each other.

It is also conceivable to combine a movable holding apparatus with loading cables.

The guide cable is preferably fastened by one end to the tower head and in the ground at a distance from the tower foot by another end, e.g., anchored by means of a ground anchor or held on an appropriately placed heavy carriage. The end of the guide means on the ground side is no longer arranged in this instance in the area of the tower foot of the wind turbine and in particular the guide means does not have to be fastened in the foundation of the wind energy turbine.

The length of the holding cable between the holding apparatus and the component can be varied in that one end of the holding cable is advantageously fastened to a fastening point of the component, in particular in the range of a rotor blade tip and another end of the holding cable is drawn in, or rolled up or the like or lengthened, rolled off or the like and the component is therewith raised from the ground or lowered to the ground. To this end the holding apparatus can be designed as a cable winch fastened to the guide means or, more advantageously, as a deflection roller for the holding cable. In the latter instance another end of the holding cable can be reeved into a holding cable winch. The holding cable winch is preferably arranged adjacent to the ground anchor or on the tower head. In another embodiment the deflection roller for the holding cable conveyor can be varied in its position on the guide cable during the mounting procedure.

At least one loading apparatus is advantageously arranged in the area of the tower head in addition to the holding apparatus from which loading apparatus a loading cable, whose length can vary between the loading apparatus and the component, runs. The at least one loading cable can be fastened by one end to a fastening point of the component, in particular in the area of a rotor blade root. The loading cable can be guided over a loading apparatus preferably designed as a loading cable deflection roller, and another end of the at least one loading cable can be reeved into an associated loading cable winch. Precisely two loading cables with two loading cable deflection rollers associated in the area of the tower head are preferably present. The cables, which are preferably a total of three, two loading cables and one holding cable, make a positionally stable transport of the component, especially of the rotor blade possible, during which the main load is carried by the loading cables. The at least one loading cable deflection roller is arranged closer to the longitudinal axis of the tower than the holding apparatus. The loading cable and the holding cable are located on the same tower side.

The holding apparatus is advantageously at a distance from the wind turbine. The distance is produced, e.g., by the sloping in the arrangement of the guide means. A minimal distance between the wind turbine and the holding apparatus can be at least 10%, preferably 20% of the tower height and/or at least one half a rotor blade length. The holding apparatus is advantageously distanced at least one rotor blade length from the wind turbine. The distance makes it possible to mount/dismantle rotor blades in an especially simple and protective manner. The substantially vertical projection of the loading apparatuses and of the holding apparatus on the ground forms corners of a triangle that are spaced far enough from each other that a rotor blade held there, especially in the ground area, can be transported in the air in a stable manner. The holding cable fastened to the rotor blade tip regulates the height of the rotor blade tip above the ground in the ground area. The tip no longer needs to be dragged along the ground as previously or held by an auxiliary crane until the rotor blade is vertically aligned but rather it can be immediately raised during mounting and lowered only later during the dismantling together with the root, that can be raised and lowered with the preferably two loading cables. Thus, the rotor blade can remain aligned at least on the ground area with its longitudinal axis substantially parallel to the ground and can be transported vertically to the ground. This saves time and therewith also expense during the mounting/dismantling since rotor blades are brought in contact and removed from it as a rule lying on their nose with their back edge standing high. This makes it possible to directly unload it from and load it onto a semi-trailer. This facilitates the handling of the very sensitive rotor blades, that can weigh up to 20 t, on the ground quite considerably.

Another advantage of the spacing of the holding means from the wind energy turbine is the regulating of the distance of the component from the wind turbine that results from the above via the holding means. The distance of the component from the wind turbine can be increased by shortening the holding means and lengthening the holding means can reduce the distance if necessary. The spacing of the holding apparatus makes it possible during the transport of the rotor blade to allow a force to act in particular on the rotor blade tip, that faces away from the tower.

In a preferred embodiment of the invention rotor blades mounted on the wind turbine comprise fastening points for connecting cables. A loading cable deflection roller is fastened to each connecting cable running from a rotor blade. The fastening points can be serviced by the maintenance personnel from a roof of a machine housing arranged in the tower head. To this end the mounted rotor blade is preferably brought into the 12 O'clock position.

The fastening points can be made available in various embodiments. Rotor blades are preferably equipped in series with fastening points provided at described positions. The fastening points can be integrated into the outer wall of the rotor blades in the area of the rotor blade root. For this, threadings or eyelets let into the rotor blade are conceivable. It is preferable if two opposing fastening points are provided whose connecting line runs transversely, preferably substantially vertically to the plane set by the rotor blade nose and rotor blade back edge. It is possible here to turn the rotor into the wind and to bring the mounted rotor blades in feathered pitch and a dihedral angle (V angle) above the machine housing and to fasten the connecting cables to the particular lower fastening point of the two rotor blades at the dihedral angle. It is also conceivable in a calm to bring the mounted rotor blades into operating position and to mount V-shaped connecting cables on each of the two rotor blades.

The integrated fastening points of the rotor blade to be mounted/dismantled can economically have the same construction as the fastening points of the mounted rotor blades. Each of the two fastening points of the rotor blade to be mounted/dismantled is intended for one end of a loading cable. The above-described position of the two fastening points makes it possible here to mount/dismantle rotor blade with the back edge of the rotor blade facing away from the tower. To this end the semi-trailer provided for the transport of the rotor blade should be driven in front of the tower foot in the direction or extension of the rotor axis.

However, fastening points can also be made available, in particular in the case of existing rotor blades that have no integrated fastening points, by collars placed around the rotor blades in addition to the mounting. The collars then have eyelets or the like for fastening the connecting cables and/or for fastening the loading cables.

The collars can be designed in a simple form as a tensioning belt; however, collars designed like hose clamps or rigid ones, e.g., comprising a metal frame are also conceivable. They can comprise apparatuses for creating a non-positive connection of the collar to the component. The apparatuses can comprise inflating bodies arranged in their interior. For safety reasons at least two inflating bodies are provided per collar. The collars can be adapted in a cross section to a cross section of a rotor blade.

In a further embodiment of the invention loading apparatuses, in particular loading cable deflection rollers, are fastened in the webs between adjacent flanges of a rotor hub. The loading apparatuses fastened on the webs make it possible to mount/dismantle rotor blades even when only one rotor blade or even no rotor blade is mounted on the rotor hub and the associated fastening points are consequently lacking.

In a preferred embodiment of the invention a fastening point for the holding means, in particular the one end of the holding cable, is made available on the rotor blade to be mounted/dismantled by a pocket that can be inserted over the rotor blade tip. However, it is also possible to place a collar preferably similar to the above-described collars around the rotor blade tip and to fasten the holding cable to this collar. However, even this fastening point can be integrated and have the same construction as the above-described, integrated fastening points.

In the case of curved rotor blades, so-called pre-bent rotor blades or also "banana blades" the holding cable can also be fastened more in the area that is central in the longitudinal direction of the rotor blade. In this instance a fastening point can be provided in the manner described above. This prevents a shifting of the "banana blade" held on the end points.

The fastening of the rotor blade on the rotor hub can take place via a flange connection. In this instance the rotor blade comprises, e.g., on its one end, a flange with a bolt pattern determined for being connected to a free flange with a perforated pattern of the rotor hub. An alignment of the two flange patterns during mounting and dismantling is facilitated by the possibilities for controlling the rotor blade.

A connection of the two loading cable deflection rollers with the two lower fastening points of the rotor blades that are already mounted and at a dihedral angle has the advantage here that the angle adjustment apparatuses associated with the mounted rotor blades and in the rotor hub can be used to adjust the position of the loading cable deflection rollers and therewith the distance of the rotor blade root to the tower. Further relative position adjustments of the two flanges are achieved by a different actuation of the two loading cable winches, as a result of which the rotor blade to be mounted/dismantled can be tilted. A second tilting movement is made possible by attracting or letting out the holding cable. During dismounting the flange is somewhat loosened at first so that the position of the rotor blade can be readily changed even here and tensions can be reduced.

As regards the process, the problem is solved by a process with the features of the invention as described below.

The process in accordance with the invention permits, at least in the ground area, the rotor blade to move vertically to the ground given a substantially parallel alignment of the longitudinal direction of the rotor blade to the ground. This makes an unloading and loading of the rotor blade from and onto a transport vehicle possible in an advantageous manner.

During mounting the component, in particular the rotor blade, is preferably raised as far as possible, that is, up to a maximal achievable height in its horizontal position as a function of the apparatus. The mounting apparatus is preferably oriented in such a manner that the rotor blade receives the flow in the direction of its longitudinal axis. As a result thereof, or only a small attack surface is offered to the wind and the rotor blade cannot strike against the tower. The rotor blade is then rotated about a transversal axis, preferably almost at mounting height, and positioned vertically under the tower head underneath a free flange. The flange alignment then takes place in a fine control operation.

During the mounting of the apparatus the guide means can be fastened to the tower head at first. The guide means, that is preferably designed as a guide cable, is tensioned using a holding cable winch. In order to achieve a better translation of force a block and tackle (set of pulleys) can additionally be used in order to tension the guide cable. It is conceivable to mount the guide means at first and subsequently the loading means or to carry out the mounting in the reverse order.

During the dismantling of the component, in particularly of the rotor blade, the flange connection is loosened, the rotor blade is lowered only somewhat and is brought at the greatest possible maximal height into the horizontal position already. The horizontally aligned to rotor blade is then lowered substantially vertically to the ground.

The invention also relates to a process for replacing a rotor blade bearing of a rotor blade of a wind energy turbine with rotor hub without a crane in that a rotor blade with a rotor blade bearing is dismantled from the rotor hub, the one rotor blade bearing is replaced by another rotor blade bearing and the rotor blade with the other rotor blade bearing is mounted on the rotor hub. The replacement in accordance with the invention is made possible without using an expensive mobile crane.

Rotor blade bearings are exposed to high wear due to constant loading. Their replacement preferably takes place by the described apparatus without using a crane.

The invention is described in three figures using an exemplary embodiment.

In FIG. 1a three process steps of the dismantling or mounting of a rotor blade 10 are shown projected over each other. Positions X, Y, Z of rotor blade 10 are moved through in this sequence during the mounting of rotor blade 100 onto wind turbine 20. During the dismantling of rotor blade 10 the process steps are moved through in the reverse sequence Z, Y, X.

Figure 2:
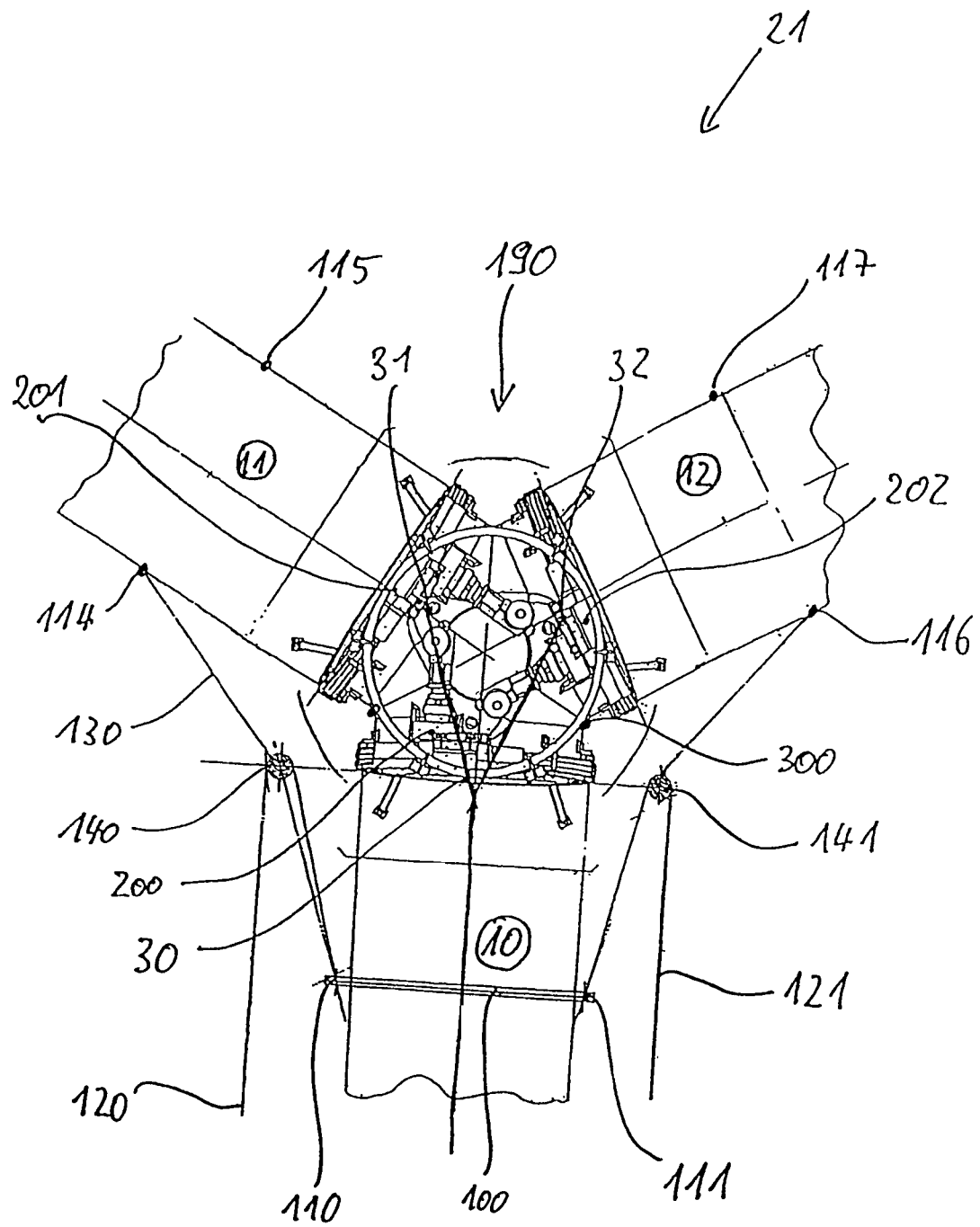
FIG. 2 shows a frontal view of an opened rotor.
Figure 3:
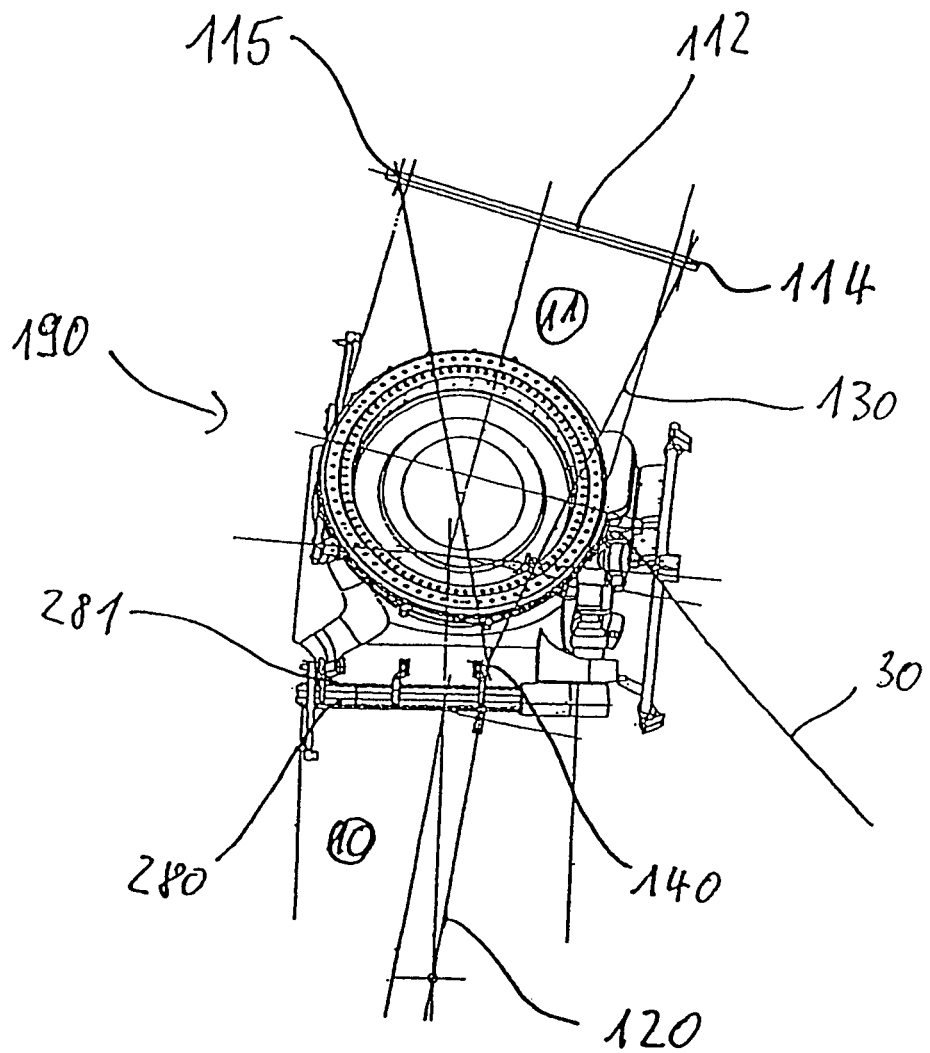
FIG. 3 shows a lateral view of the rotor in FIG. 2 with a rotor blade that is transparently shown.

The mounting/dismantling apparatus shown in FIG. 1a comprises obliquely tensioned guide cable 30 between tower head 21 of wind turbine 20 and ground 40. Guide cable 30 is detachably fastened by one end to tower head 21, as shown in FIGS. 2 and 3 to rotor hub 190 or alternatively to two mounted rotor blades 11, 12, and the other end of guide cable 30 is detachably anchored in ground 40 by a ground anchor (not shown). As an alternative to the ground anchor a heavy tractor or the like can be used. Guide cable 30 in FIG. 1 is tensioned approximately at an angle of barely 45° to the ground surface. At a tower height of 100 m the length of guide cable 30 is approximately 155 m here. It would be anchored in ground 40 at a distance of approximately 120 m from tower 22. It can be appropriate in the case of limited spatial conditions at the location of wind turbine 20 to anchor guide cable 30 at a lesser interval than the tower height, e.g., at 80 m.

Guide cable 30 is additionally tensioned for mounting and dismantling rotor blade 10 and is removed during the operation of wind turbine 20.

Holding cable deflection roller 60 is fastened to guide cable 30 starting from its one end along length L1, whose projection on ground 40 corresponds to somewhat more than the length of one rotor blade 10. Holding cable deflection roller 60 is fastened in a slip-resistant manner on guide cable 30 and remains unchanged in its position along guide cable 30 during the mounting and dismantling of rotor blade 10. The position of holding cable deflection roller 60 along guide cable 30 is adjustable. Thus, the position of holding cable deflection roller 60 can be adapted to the mounting and dismantling of rotor blades 10 of different lengths in different wind turbines 20 and different conditions of the location.

Holding cable 70 is reeved into holding cable deflection roller 60, the one end of which cable is securely connected to pocket 80 and whose other end runs to holding cable winch 90. Holding cable 70 can be rolled onto and rolled off from holding cable winch 90, during which a tip of rotor blade 10 inserted into pocket 80 is raised or lowered. Alternatively, holding cable winch 90 can also be provided on the tip of rotor blade 10 or on tower head 21 or instead of holding cable deflection roller 60.

Collar 100 for mounting and dismantling is placed around a rotor blade root opposite the tip of rotor blade 1. Collar 100 comprises fastening points 110, 111 on opposite positions for ends of loading cables 120, 121. Collar 100 comprises a tensioning apparatus with which it can be tensioned in a non-positive manner around the blade root. Alternatively, collar 100 is equipped on the inside with inflation bodies that can be inflated or filled with compressed air or water. Each of the two loading tables 120, 121 runs adjacent to and substantially parallel to tower 22 of wind turbine 20 to tower head 21. On tower head 21 each of the two loading cables 120, 121 runs over a loading cable deflection roller 140, 141 and substantially parallel to tower 22 to a loading cable winch 170, 171 arranged on a tower foot. Both loading cables 120, 121 can be rolled up and rolled off with the aid of the two loading cable winches 170, 171, during which the rotor blade root is raised respectively lowered. Rotor blade 10 is held stable in space during the mounting/dismantling on a total of three fastening points 80, 110, 111.

A pre-curved rotor blade 10, a so-called "banana blade" is shown in FIG. 1b. Rotor blade 10 is curved away from tower 22 with its rotor blade tip in operating position. This reduces the danger that the rotor blade tip strikes against tower 22 during operation. It can be appropriate in the case of such pre-curved rotor blades 10 to transport them and raise them lying on their flat side as shown in FIG. 1b. To this end a fastening point for holding cable 70 is created with a collar 81 that is fastened on the root side of the main curvature in order to prevent a shifting of rotor blade 10 during transport.

FIG. 2 shows a tower head 21 in a frontal view. A spinner has been removed and the view into a rotor hub 190 exposed. Rotor blade 10 to be removed has been rotated into the 6 o'clock position below rotor hub 190. FIG. 2 also shows two upper mounted rotor blades 11, 12 at a dihedral angle. Rotor hub 190 comprises angle adjustment apparatuses 200, 201, 202, one for each rotor blade 10, 11, 12 with which each rotor blade 10, 11, 12 can be adjusted in its angle about its longitudinal axis. In FIG. 2 rotor blades 10, 11, 12 are rotated into a feathered pitch so that the wind has no attack surface. Rotor blade 11 comprises, at an interval from its rotor blade root, two fastening points 114, 115 integrated in the outer wall and rotor blade 12 comprises two fastening points 116, 117 integrated in the same position. Of the paired fastening points 114, 115 and 116, 117 one, 114 or 116, is arranged at a feathered pitch on the bottom of rotor blade 11 and 12, and one fastening point 115 respectively 117 is arranged above on rotor blade 11 respectively 12. A connecting cable 130, 131 runs from the two lower fastening points 114, 116 of the two upper rotor blades 11, 12 on the ends of which cable opposite fastening points 114, 116 loading cable deflection rollers 140, 141 are arranged. One of the two loading cables 120, 121 is reeved into each of the two loading cable deflection rollers 140, 141. The one ends of the two loading cables 120, 121 are connected to the two fastening points 110, 111 of collar 100 detachably fastened to rotor blade 10.

In the state shown in FIG. 2 the actual dismantling of lower rotor blade 10 can be started. The structure of the dismantling apparatus itself takes place, e.g., in the following stages:

At first an upper mounted rotor blade 11 in FIG. 2 is brought clockwise in the 12 o'clock position. A maintenance person can then fasten connecting cable 130 with loading cable deflection roller 140 to the one fastening point 114 of the one upper rotor blade 11 from the roof of machine housing 23. A light auxiliary cable, e.g., a nylon cable, is reeved into loading cable deflection roller 140, the two ends of which cable are let down to ground 40. The one end of loading cable 120 is fastened to the one end of the auxiliary cable by a suitable cable connector. The one loading cable 120 is reeved into the one loading cable deflection roller 140 by means of the one loading cable winch 170 via the auxiliary cable and its one end is drawn a little further by loading cable deflection roller 140. The reeved end of loading cable 120 is secured by cable stoppers.

The rotor is then rotated 120° counterclockwise and the corresponding procedure is repeated for the other upper, mounted rotor blade 12.

Then, collar 100 is placed around motor blade 10 to be dismantled. To this end blade 10 is rotated counterclockwise into the 12 o'clock position and the maintenance person can place collar 100 around the root of rotor blade 10 to be dismantled from the roof of the machine housing. Then, the one end of the one loading cable 120 is fastened to the one fastening point 110 of collar 100.

Rotor blade 10 to be dismantled is then rotated counterclockwise into the 6 o'clock position and brought back counterclockwise into the 12 o'clock position and the fastening process for the one end of the other loading cable 121 is repeated, which also fastens the other loading cable 121 to the other fastening point 111 of collar 100. The rotor blade to be mounted can be brought back clockwise into the 6 o'clock position.

Alternatively, the mounting of collar 100 and the fastening of loading cables 120, 121 can also take place by a cable climber in the 6 o'clock position.

Guide cable 30 is brought factory-made, that is, with holding cable deflection roller 60 and reeved holding cable 70 into machine housing 23. The one end of holding cable 70 is fastened to pocket 80 and the pocket is inserted, e.g., by a cable climber, over the tip of rotor blade 10 and prevented from slipping down by an auxiliary cable.

Then, the one end of guide cable 30 is fastened on the front of motor hub 190. To this end rotor hub 190 can comprise a fixed tube running to the tip of the spinner to the end of which tube guide cable 30 is fastened (not shown in FIGS. 2 and 3). Guide cable 30 is advantageously fastened to a fastening point located on the axis of rotation of rotor hub 190. Then, rotor hub 190 can be rotated even after the mounting or guide cable 30. After the one end of guide cable 30 has been fastened to rotor hub 190 the remaining manufactured guide cable 30, 60, 70 is let down, tensioned and anchored. In FIG. 2 guide cable 30 is alternatively fastened at two fastening points 31, 32 to rotor hub 190.

It is also possible to exchange the mounting sequence of loading cables 120, 121 with associated loading cable rollers 140, 141 and guide cable 30. In this instance fastening point 31, 32 for guide cable 30 should be on the axis of rotation of rotor hub 190. The first-mounted guide cable 30 then offers the possibility of moving a manned basket along rotor blade 10 in the 6 o'clock position, e.g., by means of another deflection roller or by means of holding cable deflection roller 60 moved up close to rotor hub 190. This makes it possible to perform mounting work such as drawing pocket 80 over or attaching loading cables 120, 121 even without cable climbers.

FIG. 3 shows an apparatus that differs from the dismantling apparatus shown in FIG. 2 since connecting cables 130, 131 are at a dihedral angle there. The fastening points are not integrated there into the rotor blade wall but rather are arranged on opposite points 114, 115 of collar 112 on rotor blade 11 and 116, 117 of a collar (not shown) on rotor blade 12. In deviation from the representations, all rotor blades 10, 11, 12 preferably have identical fastening points 110, 111, 114, 115, 116 117, either integrated or fastening points 110, 111, 114, 115, 116 117 made available by collars 100, 112.

The dismantling apparatus is mounted and the dismounting of lower rotor blade 10 can begin in the position shown in FIG. 2 and FIG. 3.

During the dismantling of rotor blade 10 blade flange screw coupling 280, 281 is carefully loosened during which the alignment of rotor blade 10 is corrected via holding cable 70 and the two loading cables 120, 121 and angle adjustment apparatuses 200, 201, 202. Then, blade flange screw connection 280, 281 is completely loosened and rotor blade 10 is lowered. Rotor blade 10 is pulled away as early as possible from tower 22 in order to avoid a collision with tower 22 of wind turbine 20.

The mounting of the mounting apparatus takes place in a manner very similar to that of the mounting of the dismantling apparatus and it will therefore not be described in detail. The fact that loading cables 120, 121 are further reeved by loading cable deflection rollers 140, 141 and that the particular one end of holding cable 120, 121 can be let down to the ground and the mounting of pocket 80 can take place there is different.

During the mounting of rotor blade 10 all three cable winches 90, 170, 171 are then immediately actuated and rotor blade 10 is raised in a horizontal position substantially vertically to the ground surface. The mounting apparatus makes it possible to unload rotor blade 10 directly from the transport vehicle. Rotor blade 10 is drawn up as high as possible in the horizontal position. After rotor blade 10 has been drawn up, holding cable winch 90 is actuated in a direction opposite to that of the two loading cable winches 170 171. Thus, rotor blade 10 rotates about one of its transverse axes. This procedure is continued until rotor blade 10 is positioned under tower head 21 substantially vertically to the ground surface and parallel to tower 22. During this time holding cable 70 remains tightened to the extent that rotor blade 10 can not strike against tower 22.

In order to coordinate the numbers and speeds of rotation of both loading cable winches 170, 171 and of holding cable winch 90 a control apparatus (not shown) is provided. Each cable winch 90, 170, 171 can preferably be individually controlled.

The weight of rotor blade 10 is between 4 and 7 t here. The carrying capacity of guide cable 30 is a function of the desired cable tension and is more than 8 t. The carrying capacity of the two loading cables 120, 121 would be approximately 6 t each here including the safety capacity and the carrying capacity of the one holding cable 70 including the safety capacity approximately 2 to 3 t.

During the mounting of rotor blade 10 the adjustment of the flange images or patterns of flange 280 arranged on rotor blade 10 and the flange 281 arranged on rotor hub 190 is necessary. Flange 280 arranged on rotor blade 10 comprises projecting bolts and flange 281 arranged on rotator hub 190 comprises perforations associated with the bolts. The two flange images must first be brought to coincidence and then inserted into one another. In order to be able to bring the two flange images into coincidence at all, rotor blade 10 must be guided precisely to rotor hub 190. The position of rotor blade 10 can be precisely controlled by actuating cable winches 90, 170, 171 of the three cable 70, 120, 121 and angle adjustment apparatuses 201, 202 of the two upper rotor blades 11, 12. A further degree of freedom for adjustment consists in actuating angle adjustment apparatus 200 associated with free flange 281 with which the associated flange can be rotated.

The position of rotor blade 10 relative to its angular position relative to tower 22 can be controlled with the aid of the one holding cable 70. The tip of rotor blade 10 can be moved away from tower 22 by tightening holding cable 70 and when holding cable 70 is loosened, the tip of rotor blade 10 moves toward tower 22. In a corresponding manner an angular position in the plane of the two flanges 280, 281 relative to one another can be adjusted, which plane is set by guide cable 30 and tower 22.

The angular position of the two flanges 280, 281 vertically to the named plane can take place by a relative adjustment of the two loading cables 120, 121. Tightening the left loading cable 120 in FIG. 2 reduces the distance between flange 280 of rotor blade 10 and between flange 281 of rotor hub 190 on the left side. Tightening the right loading cable 141 in FIG. 2 reduces the distance between flange 281 of rotor blade 10 and between flange 281 of rotor hub 190 on the right side.

The distance of rotor blade 10 and of the rotor blade root to tower 22 can be controlled by the two angle adjustment apparatuses 201, 202 of the two upper rotor blades 11, 12. The two upper rotor blades 11, 12 can rotate here about a longitudinal axis. Fastening points 114, 116 can therefore be moved away from and toward the tower by angle adjustment apparatuses 201, 202 of upper rotor blades 11, 12.

Furthermore, rotor hub 190 can also be rotated about its axis of rotation as an additional degree of freedom.

The process can also be used to replace rotor blade bearings arranged between the two flanges 280, 281.

The invention claimed is:

1. An apparatus for mounting and/or dismantling a component having a root area and a tip area of a wind turbine having a tower head, the apparatus comprises at least one guide means tensioned between the tower head and the ground, on which guide means at least one holding apparatus is arranged that holds at least a partial load of the weight of the component during a transport of the component between the ground and the wind turbine, and wherein a loading cable runs from at least one loading apparatus to the root area and the length of loading cable can be varied between the loading apparatus and the root area and wherein at least one loading apparatus is arranged in an area of the tower head and is adapted to hold at least one further partial load of the component during a transport of the component between the ground and the wind turbine and in that at least one holding cable runs from the holding apparatus to the tip area, and wherein a length of the holding cable can be varied between the holding apparatus and the component, wherein the positions of the root area and the tip area are controllable by the respective holding cable and loading cable such that at least in the ground area the component is moved vertically with respect to the ground given a substantially parallel alignment of a longitudinal direction of the component to the ground and the component is then rotated about a transversal axis and positioned vertically under the tower head.

2. The apparatus according to claim 1, wherein the component is a rotor blade.

3. The apparatus according to claim 1, wherein the holding apparatus is arranged substantially fixed on the guide means during the mounting/dismantling of the component.

4. The apparatus according to claim 1, wherein the guide means is obliquely tensioned between the tower head and the ground.

5. The apparatus according to claim 1, wherein the guide means comprises a guide cable.

6. The apparatus according to claim 1, wherein the at least one loading apparatus comprises a loading cable deflection roller for the loading cable and that one end of the loading cable is reeved into a loading cable winch.

7. The apparatus according to claim 1, wherein exactly two loading apparatuses are provided.

8. The apparatus according to claim 1, wherein the at least one loading apparatus is fastened to webs arranged between adjacent flanges of a rotor hub.

9. The apparatus according to claim 1, wherein fastening points for the at least one holding cable are provided at a distance from a rotor blade root of the rotor blade to be mounted/dismantled.

10. The apparatus according to claim 1, wherein a minimal distance between the wind turbine and the holding apparatus corresponds at least to approximately 10% of the height of a tower of the wind turbine.

11. The apparatus according to claim 10, wherein the minimal distance between the wind turbine and the holding apparatus corresponds at least to one half the length of a rotor blade of the wind turbine.

12. The apparatus according to claim 1, wherein the holding apparatus comprises a holding cable deflection roller for the holding cable and wherein one end of the holding cable is reeved into a holding cable winch.

13. The apparatus according to claim 12, which further comprises a control apparatus for controlling roll-on or roll-off speed of the cable winch.

14. The apparatus according to claim 1, wherein the component to be mounted/dismantled is a rotor blade, and the rotor blade comprises fastening points for an end of at least one loading cable and/or of the at least one holding cable.

15. The apparatus according to claim 14, wherein at least one fastening point for the at least one loading cable is provided on a rotor blade root of the rotor blade to be mounted.

16. The apparatus according to claim 15, wherein the fastening points are integrated into an outer wall of the rotor blade.

17. The apparatus according to claim 1, wherein rotor blades mounted on the wind turbine comprise fastening points for a connecting cable to which a loading cable deflection roller is fastened, and wherein the fastening points can be reached by a maintenance person located on a roof of a machine housing at a vertical position of the mounted rotor blade.

18. The apparatus according to claim 17, wherein the fastening points are arranged on a collar placed over the root area of the mounted rotor blade.

19. The apparatus according to claim 17, wherein the fastening points are integrated into an outer wall of the rotor blade.

20. The apparatus according to claim 19, wherein integrated fastening points of rotor blades that are mounted and integrated fastening points of a rotor blade to be mounted/dismantled have the same construction.

21. A wind energy turbine with a tower and a tower head and at least one fastening means on a tower head for a guide means of an apparatus for mounting and/or dismantling a component having a root area and a tip area of a wind turbine with a tower head, the apparatus comprises at least one guide means that can be tensioned between the tower head and the ground, on which at least one holding apparatus can be arranged that carries at least a partial load of a weight of the component during a transport of the component between the ground and the wind turbine, and wherein a loading cable runs from at least one loading apparatus to the root area and a length of the loading cable can be varied between the loading apparatus and the root area and wherein the at least one loading apparatus is arranged in an area of the tower head and is adapted to hold at least one further partial load of the component during a transport of the component between the ground and the wind turbine and in which at least one holding cable runs from the holding apparatus to the tip area whose length can be varied between the holding apparatus and the component wherein the positions of the root area and the tip area are controllable by the respective holding cable and loading cable such that at least in a ground area the component is moved vertically with respect to the ground given a substantially parallel alignment of a longitudinal direction of the component to the ground and the component is then rotated about a transversal axis and positioned vertically under the tower head.

22. The wind energy turbine according to claim 21, wherein at least one rotor blade comprises integrated fastening points for fastening loading cables and/or connecting cables for loading apparatuses.

23. A process for mounting and/or dismantling a component having a root area and a tip area from a wind energy turbine having a tower and a tower head, the apparatus comprises at least one guide means is tensioned between the tower head and the ground, and on which guide means a holding apparatus is arranged, that is adapted to hold a partial load of the weight of the component during a transport of the component between the ground and the wind turbine, and wherein a loading cable runs from at least one loading apparatus to the root area and a length of the loading cable can be varied between the at least one loading apparatus and the root area, comprising the steps of
fastening the component to a holding cable, that runs from the holding apparatus to the tip area and the holding cable has a length that varies between the holding apparatus and the component,
controlling the positions of the root area and the tip area by the respective holding cable and loading cable,
moving the component substantially vertical with respect to the ground in an area of the ground given a substantially parallel alignment of a longitudinal direction of the component to the ground,
rotating the component about a transversal axis, and
positioning the component vertically under the tower head.

24. The process according to claim 23, wherein the component is a rotor blade.

25. The process according to claim 23, wherein the holding apparatus is fixed to the guide means.

26. The process according to claim 23, wherein the component is first raised during the mounting with a longitudinal axis substantially parallel to the ground, is then rotated about an axis running transversely to the longitudinal axis, and is then raised up to the tower head.

27. The process according to claim 23, wherein the component is rotated until its longitudinal axis is substantially vertical to the ground.

28. The process according to claim 23, wherein the component is raised vertically to a maximal height aligned substantially parallel to the ground.

29. The process according to claim 23, wherein the rotor blade is first separated from a rotor hub, the rotor blade is rotated about a transverse axis at maximal height until the longitudinal axis is arranged substantially parallel to the ground and the rotor blade is then lowered substantially vertically to the ground.

30. The process according to claim 23, wherein the wind energy turbine further comprises a manufactured guide cable that is brought into a machine housing with a holding cable deflection roller and holding cable reeved in it, wherein one end of the guide cable is fastened to at least one fastening point located on an axis of rotation of the rotor and that the rest of the manufactured guide cable is let down to the ground, and wherein the guide cable is tensioned and anchored.

31. The process according to claim 23, wherein a guide cable is tensioned with a holding cable winch and wherein the holding cable winch is then used to roll up and/or roll out the holding cable.

32. A process for replacing a rotor blade bearing without a crane, on a rotor blade of a wind energy turbine having a tower, a tower head, a rotor hub, and a rotor blade, comprising the steps of dismantling a rotor blade bearing from the rotor hub, dismantling the rotor blade according to claim 23 from the wind turbine, replacing a dismantled first rotor blade support with a second rotor blade support, and mounting the rotor blade with said second rotor blade support onto the rotor hub.

33. The process according to claim 32, wherein the first rotor blade support is replaced by the second rotor blade support on the ground.

* * * * *